US006073958A

United States Patent [19]

[11] Patent Number: 6,073,958
[45] Date of Patent: Jun. 13, 2000

Gagnon

[54] ALL TERRAIN WHEELCHAIR

[76] Inventor: Brian Gagnon, 4311 NW. 64th Ave., Coral Springs, Fla. 33067

[21] Appl. No.: 09/330,485

[22] Filed: Jun. 11, 1999

Related U.S. Application Data

[60] Provisional application No. 60/088,982, Jun. 11, 1998.

[51] Int. Cl.[7] ........ B62M 1/14

[52] U.S. Cl. ........ 280/650; 280/647; 280/657

[58] Field of Search ........ 280/639, 642, 280/644, 646, 647, 42, 649, 650, 651, 657, 658; 297/17

[56] References Cited

U.S. PATENT DOCUMENTS

| | | | |
|---|---|---|---|
| 4,813,693 | 3/1989 | Lockard et al. | 280/650 |
| 4,974,870 | 12/1990 | Jarke et al. | 280/650 |
| 5,273,307 | 12/1993 | Jarke et al. | 280/650 |
| 5,310,208 | 5/1994 | Jarke et al. | 280/650 |
| 5,669,623 | 9/1997 | Onishi | 280/650 |
| 5,791,672 | 8/1998 | Masclef | 280/650 |

*Primary Examiner*—Richard M. Camby
*Attorney, Agent, or Firm*—Robert M. Downey, P.A.

[57] ABSTRACT

An all terrain wheelchair for outdoor recreational use is made of non-corrosive materials, such as polyethylene plastic, stainless steel and aluminum, and includes opposite frame members, a collapsible hinged brace assembly fitted between the frame members which locks in an expanded box configuration to hold the opposite frame members apart, defining an operable position for use of the wheelchair. The front and rear wheels include wide rims having horizontal ribs to provide increased traction and surface contact area when traversing soft terrain. Removable armrests are provided to aid ingress and egress of a person in and out of the wheelchair. A shade cover mounts to the frame members to provide protection from the sun and rain. In the expanded, locked position, the box shaped brace assembly provides a storage area under the seat and includes hinged doors at the rear and an open front to provide access to an interior of the box structure. The box structure of the brace assembly further accommodates a removable flotation device, and spokes on the rear wheels form paddle like structures that provide propulsion means in water.

5 Claims, 7 Drawing Sheets

ALL TERRAIN WHEELCHAIR

This application is a provisional of Ser. No. 60/088,982 filed Jun. 11, 1998.

BACKGROUND OF THE INVENTION

1. Field of the Invention

The present invention relates to a wheelchair and, more particularly, to a wheelchair constructed for outdoor recreational use and including wheels having wide rims and paddle shaped spokes, and a box shaped brace assembly between opposite frame members for locking the wheelchair in an expanded, operable mode. The box shaped brace assembly, when expanded, defines a storage area as well as a receiving port for a flotation device.

2. Description of the Related Art

Historically, wheelchairs were designed for use indoors, and particularly in medical institutions and homes having hard floor surfaces such as tile, pavement, concrete and the like. Through evolution of the development of the modern day wheelchair little attention was given to aesthetics and multi-terrain features. Consequently, most wheelchairs have institutional, unattractive design which is limited to use on flat, hard surfaces. Moreover, the conventional wheelchair evokes a negative stigma, especially in the perception of children and those people new to the use of a wheelchair. Additionally, the wheels on conventional wheelchairs are narrow and perform poorly on soft surfaces, such as grass, sand, mud, and the like, resulting in much inconvenience for wheelchair users when they wish to participate in outdoor activities.

There has been some development in the field of specialty wheelchairs that are designed for particular sporting activities. For instance, there are various wheelchairs particularly designed for sports such as wheelchair basketball and road racing. Others in the art have proposed oversized wheels for use on sand, grass, mud, and like terrain. While some of these all terrain wheelchairs have been found to be generally effective in traversing softer ground surfaces, they are usually large and bulky and not cosmetically pleasing. They often do not conform to internationally recognized wheelchair dimensions which are usually applied to the construction of wheelchair facilities such as ramps, access ways, lifts, and the like. For this reason, most "all terrain" wheelchairs in the art are not able to use public wheelchair facilities due to their enlarged size.

SUMMARY OF THE INVENTION

The present invention is directed to a manually propelled all terrain vehicle for outdoor recreational use which is capable of travelling over surfaces such as grass, sand, mud and the like, regardless of weather conditions, and yet its dimensions conform to modern building codes regulating door clearances and the like. The rugged and cosmetically pleasing design of the all terrain vehicle reduces the stigma that is sometimes associated with wheelchairs for the physically challenged.

In addition to its ruggedness, the all terrain wheelchair of the present invention is designed for extended exposure to the elements, including fresh and salt water, without damage. All of the components used in the construction of the all terrain wheelchair are non-corrosive and include such materials as molded polyethylene plastic, stainless steel and aluminum.

The rims of the wheels in the present invention are constructed to be extra wide to provide increased surface contact area in softer terrain. Traction means are provided as transverse ribs extending outwardly and inwardly from the base of the tire to the edges of the rim. These ribs provide grip for turning the wheels and aid in providing traction in soft terrain.

The armrests are removably fitted to the side frame members and detach therefrom to allow ingress and egress of a person in and out of the wheelchair. The right armrest is provided with a cup holder in the upper portion of the armrest, centered on the outer edge.

A detachable shade cover provides protection from sun and rain. The shade cover is embodied as a structure formed by two aluminum tubes and a rectangular piece of canvas. The aluminum tubes extend from the upper rear portion of the wheelchair side frame members and bend forward so that the upper portion of the tubes are horizontal. Canvas is connected between the horizontal portions of the tubes to provide a cover above the wheelchair.

The wheelchair embodies hinged upper and lower horizontal support members that provide expanding and collapsing means for locking the wheelchair into an expanded operable position or collapsed storage position. Two hinged rear doors are provided to allow the area between the horizontal support members to be used for storage.

The wheelchair is also a manually propelled marine vehicle when used with the optional flotation device. The spokes of the rear wheels form paddle like structures that provide propulsion means in water. The flotation device has a center section with outriggers attached to the right and left sides. A bow portion attaches to the front of the center section. The doors of the wheelchair's storage area open so that the bow and the center portion of the flotation device are inserted and extend through the storage area. The outriggers are positioned with one to either side of the wheelchair. The bow and outriggers fold over the center portion of the flotation device to form a compact unit for transportation and storage.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
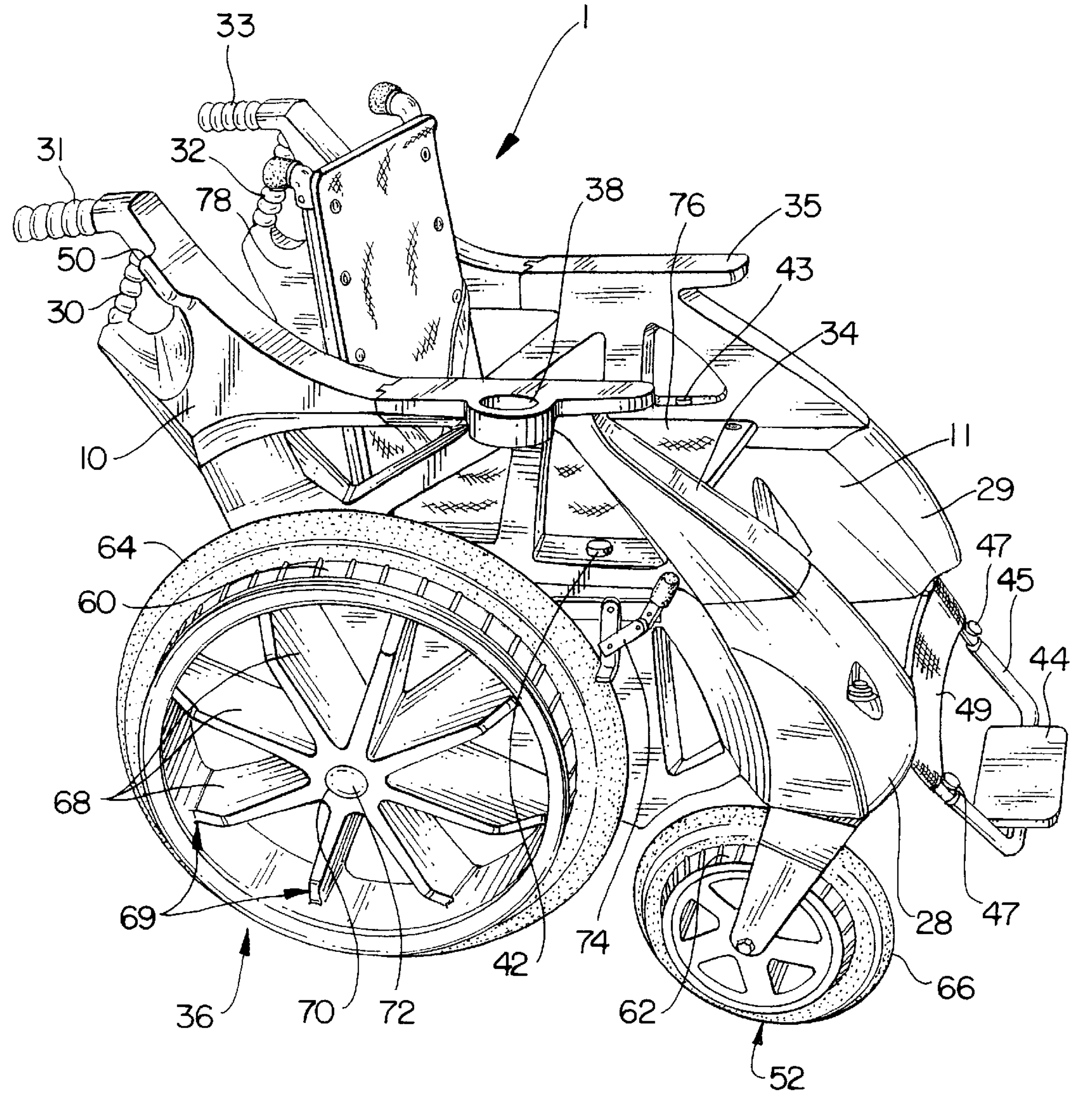
FIG. 1 is a perspective view of the all terrain wheelchair in an expanded, operable position.
Figure 2:
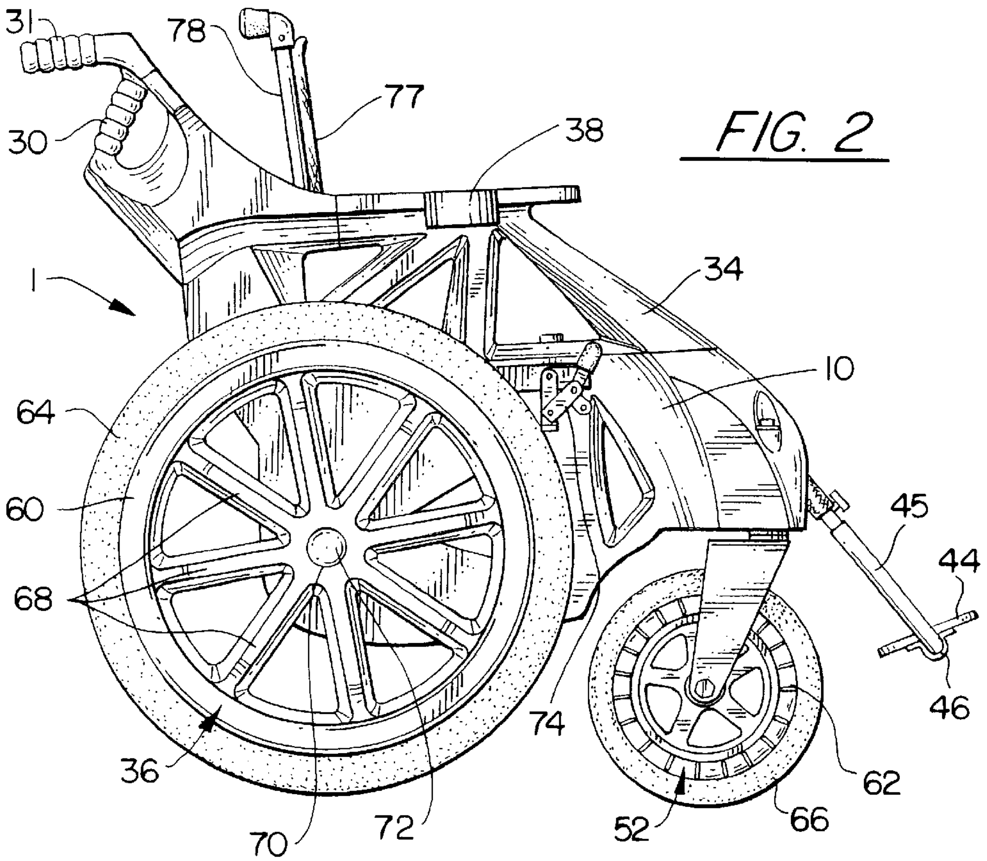
FIG. 2 is a right side view of the all terrain wheelchair in an expanded, operable position.
Figure 3:
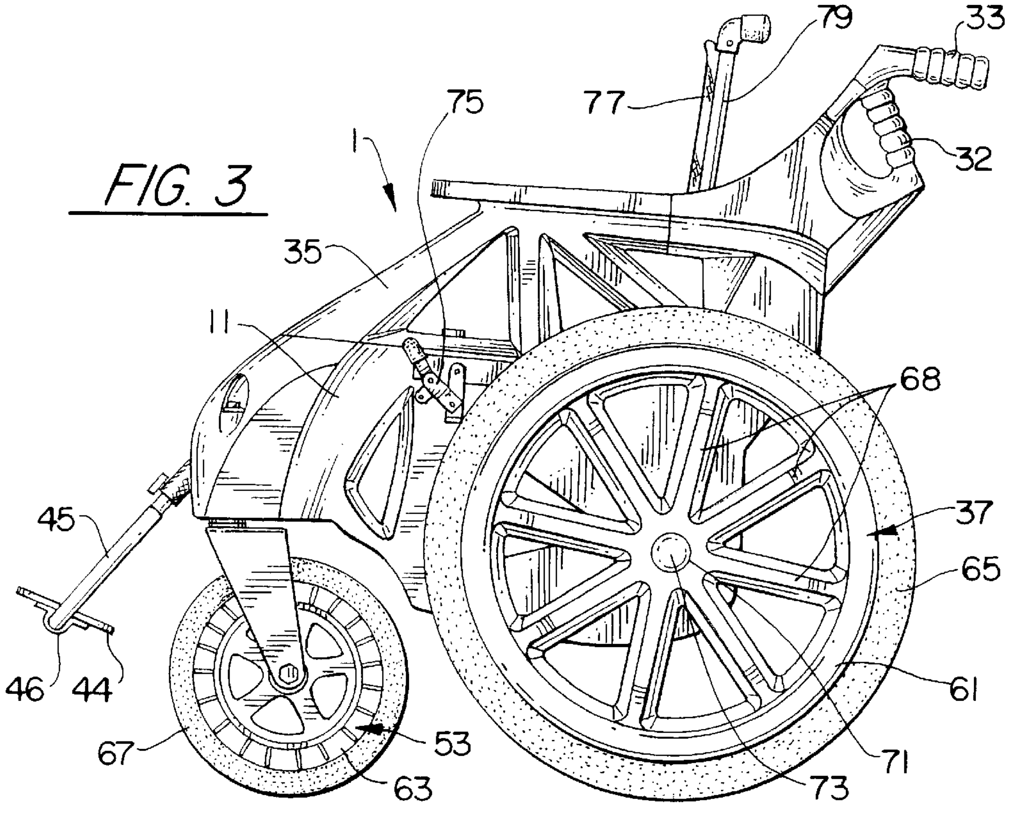
FIG. 3 is a left side view of the all terrain wheelchair in an expanded, operable position.
Figure 4:
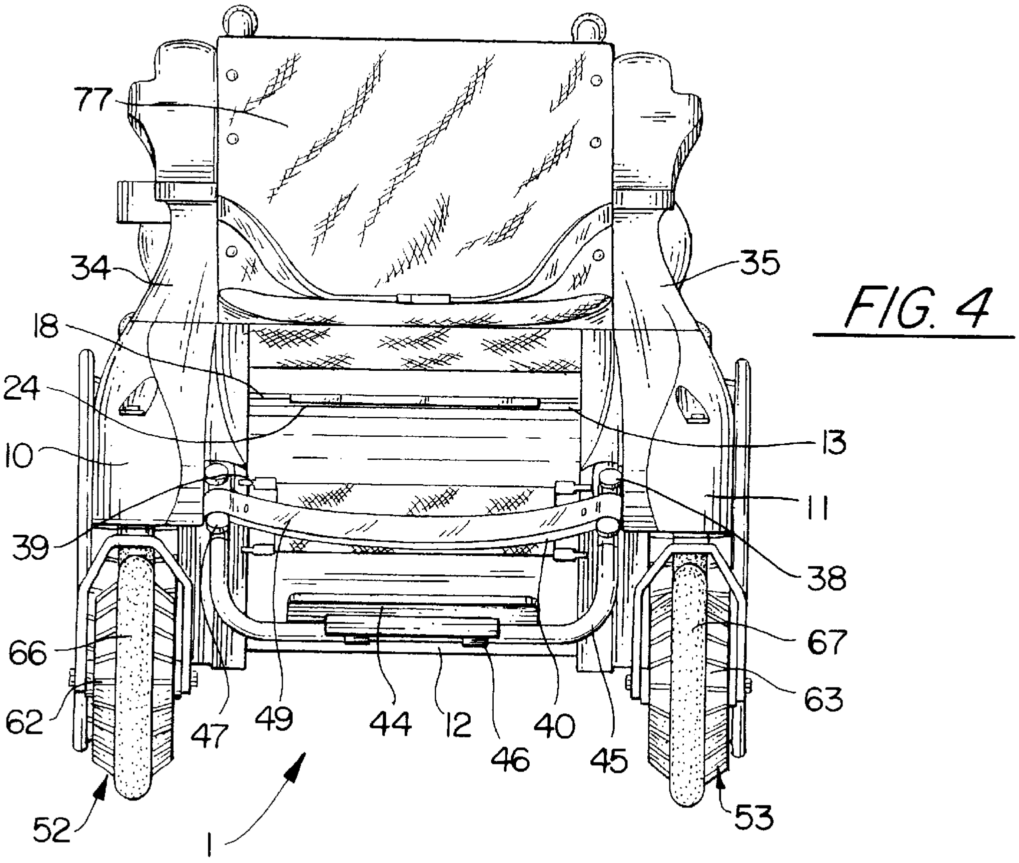
FIG. 4 is a front view of the all terrain wheelchair in an expanded, operable position.
Figure 5:
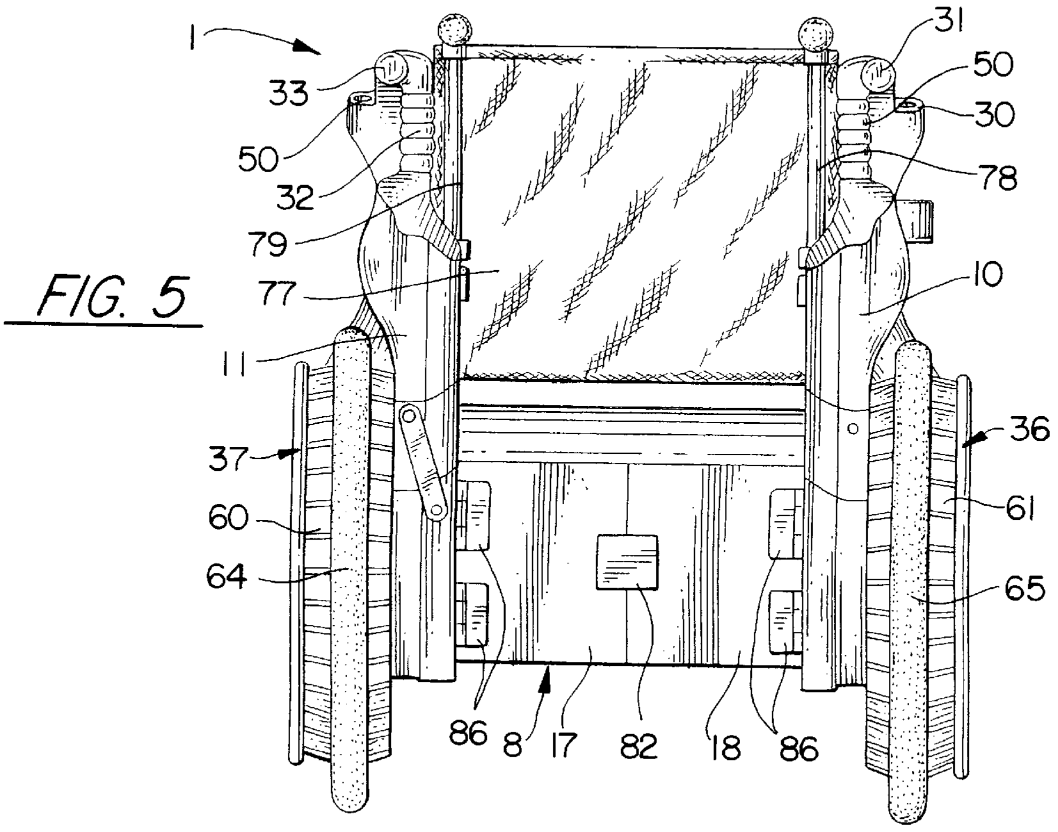
FIG. 5 is a rear view of the all terrain wheelchair in an expanded, operable position.
Figure 6:
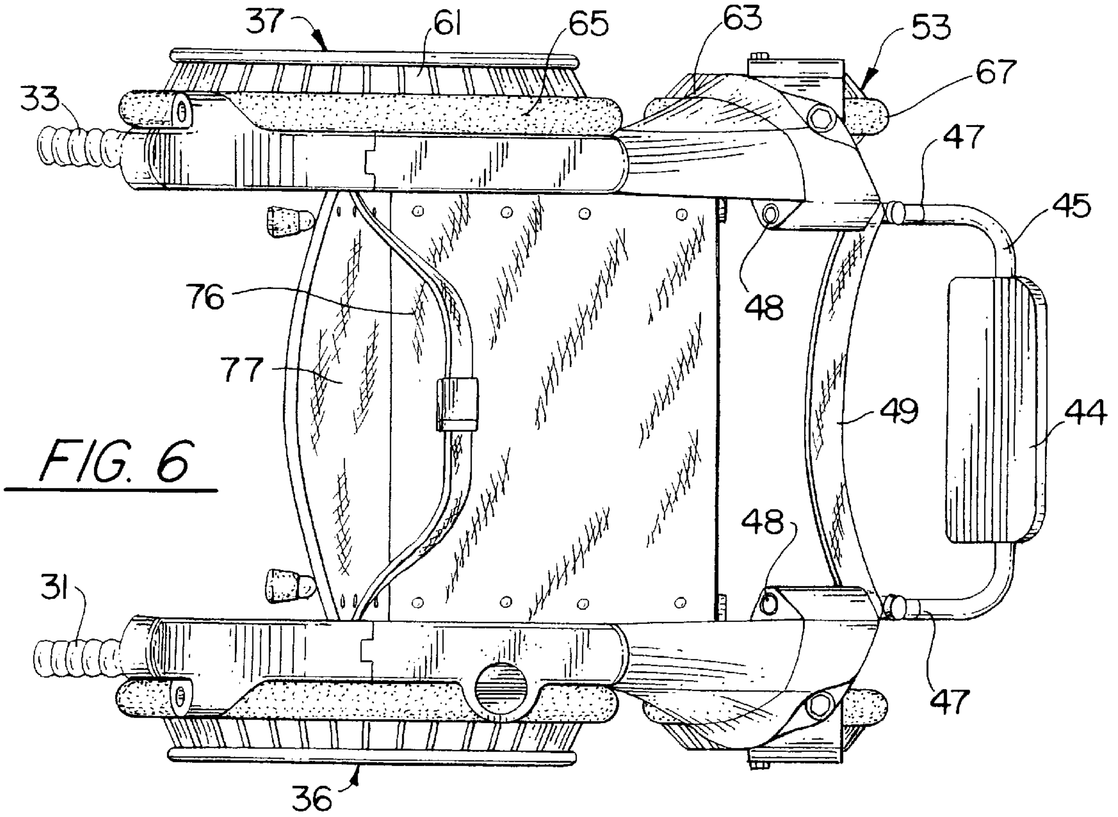
FIG. 6 is a top view of the all terrain wheelchair in an expanded, operable position.
Figure 7:
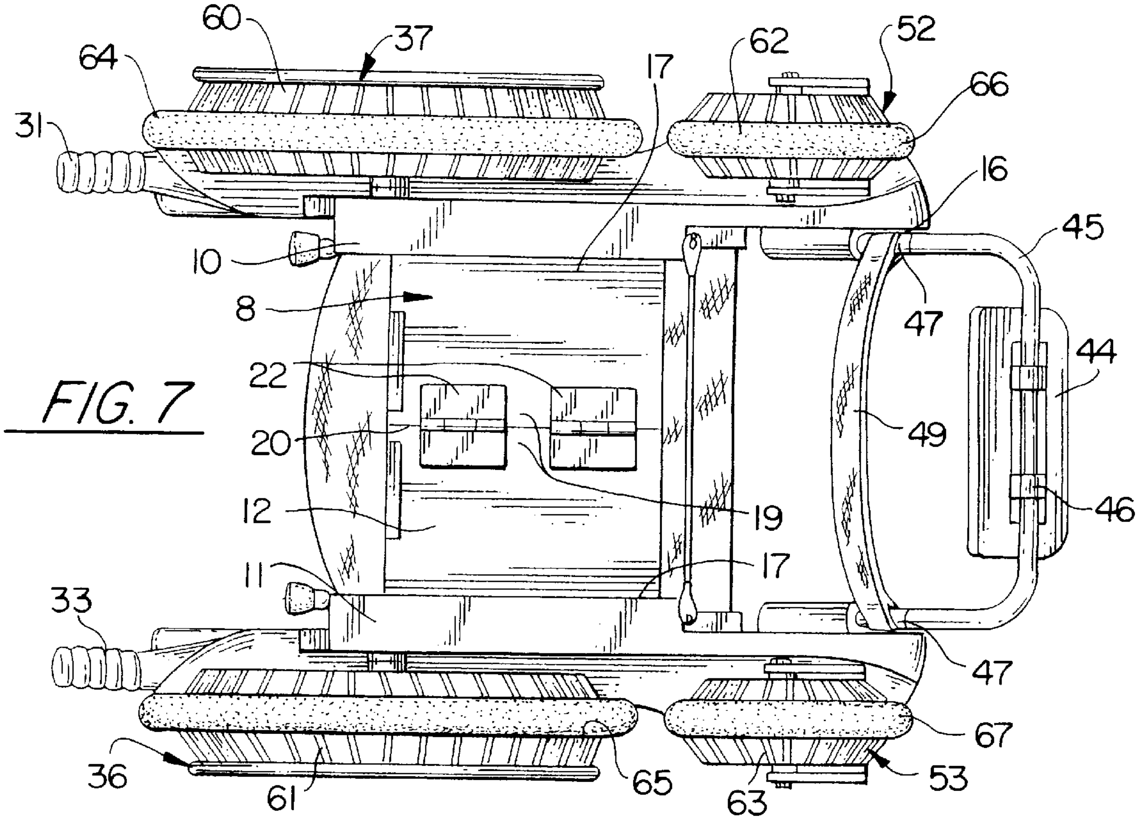
FIG. 7 is a bottom view of the all terrain wheelchair in an expanded, operable position.

Referring to the several drawing figures, the all terrain wheelchair is shown and is generally indicated as 1. The all terrain wheelchair 1 includes two side frame members 10, 11 which are connected together by expanding and collapsing means for locking the frame members in an operable position and further for collapsing the frame members towards one another for transporting or storing the all terrain wheelchair when not in use. The expanding and collapsing means is defined by a brace assembly 8, having a generally box-like structure which includes a lower horizontal support member 12 and an upper horizontal support member 13 which, together, provide the primary support structure for maintaining the wheelchair 1 in an expanded, operable position. Embodied in the side frame members 10, 11 is a square section 26 from which the nose sections 28, 29 protrude forward, the handles 30, 31, 32, 33 extend rearwardly and upwardly, and the armrests 34, 35 and rear wheels 36, 37 attach.

Figure 8:
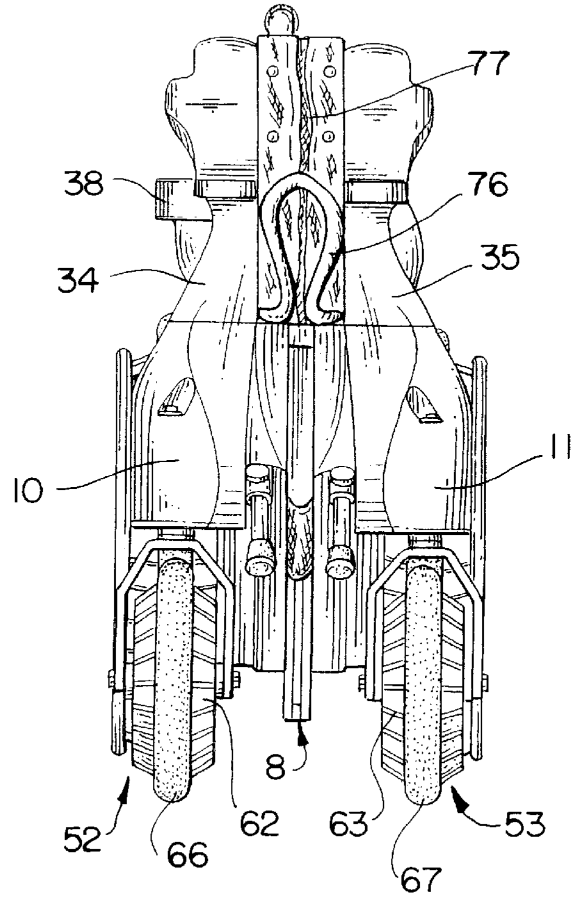
FIG. 8 is a front view of the all terrain wheelchair in a folded, storage position.
Figure 9:
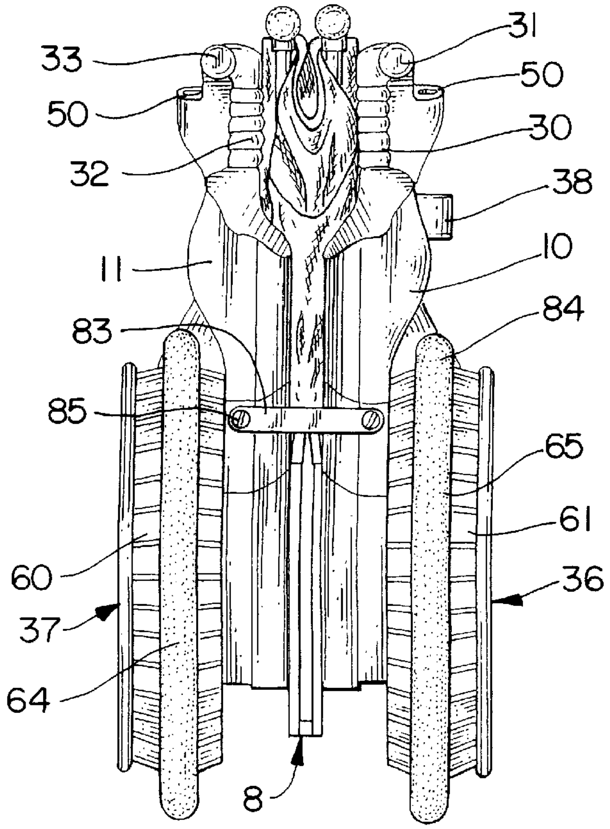
FIG. 9 is a rear view of the all terrain wheelchair in a folded, storage position.
Figure 10:
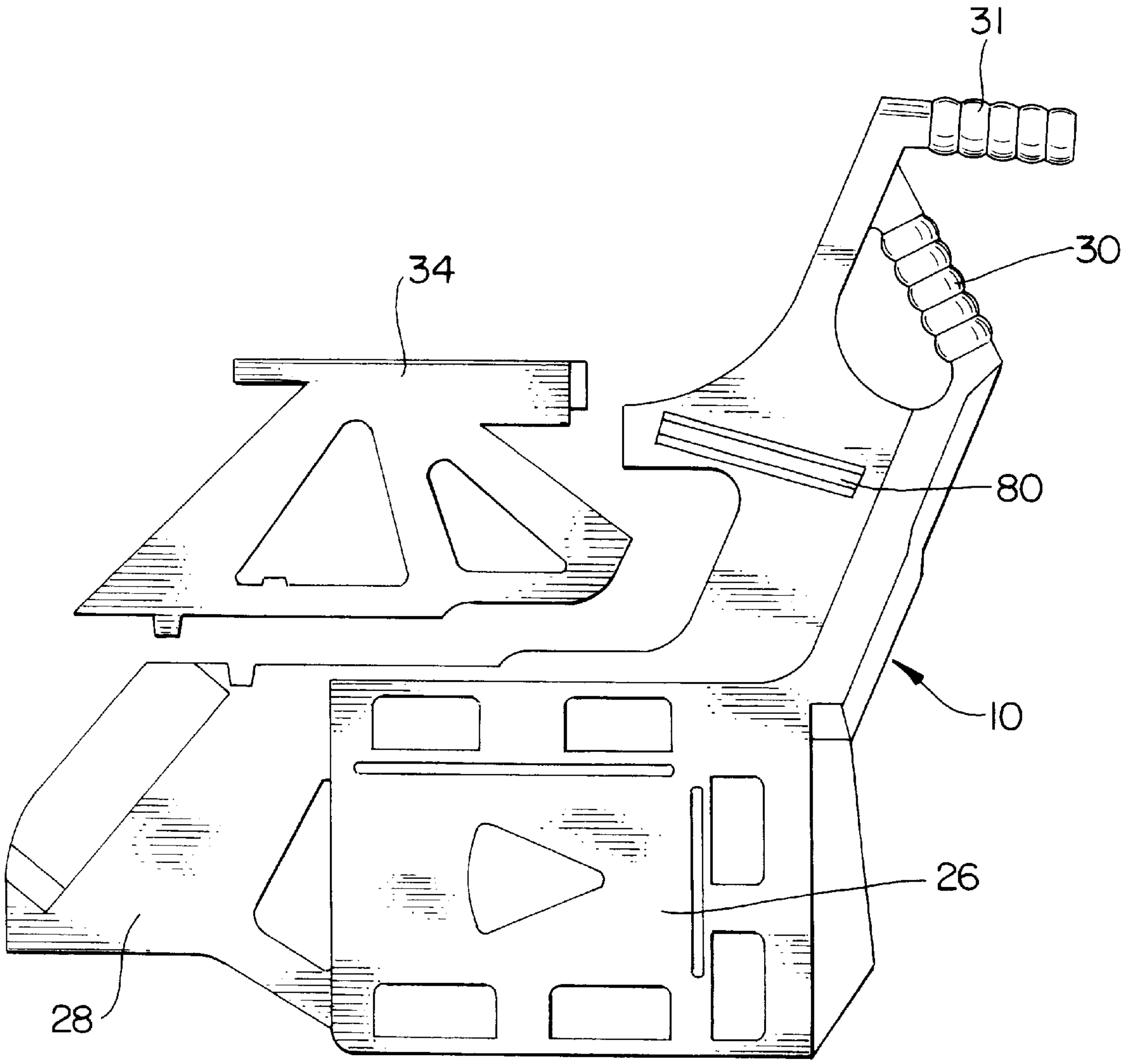
FIG. 10 is a section view of the inward facing side of the right side frame member.
Figure 11:
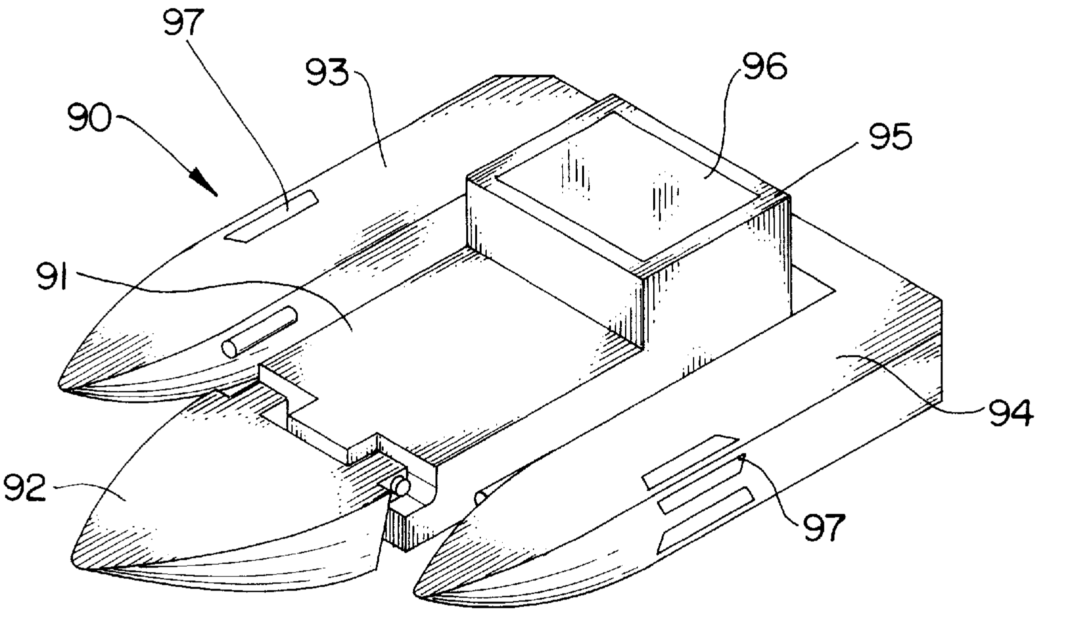
FIG. 11 is a perspective view of the optional flotation device in its expanded, operable position.
Figure 12:
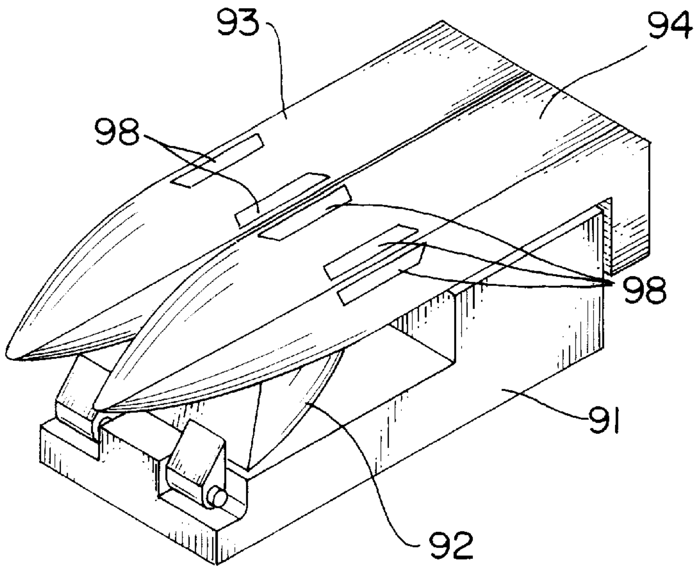
FIG. 12 is a perspective view of the optional flotation device in its folded storage position.

The upper and lower support members 12, 13 are hingedly movable between a collapsible position and an expanded, locked position. Each support member includes two rigid rectangular panels 16. Outboard edges 17 of each of the panels 16 are movably attached to the respective side frame members 10, 11 by hinges 18, creating a collapsible box structure which folds along a central hinge line 20, using hinges 22 which attach to inboard edges 19 of the panels 16. The hinges 22 are structured to allow the inboard edges 19 of the panels 16 to fold upward along the hinge line 20, so that the two side frame members move together, in stacked relation, as shown in FIGS. 8 and 9, thereby facilitating storage and/or transport of the wheelchair. A rigid locking clip 24 having a U-shaped channel is removably fitted across the front peripheral edges of the panels 16 of the upper horizontal support to prevent hinge movement along the hinge line when the frame members are in the expanded (fully separated), operable position. The panels 16 are available in a variety of widths to allow for various wheelchair sizes.

Two rear doors 17, 18 are provided, vertically extending from the lower horizontal support member to the upper support member, including a left door and a right door. Hinges 86 are provided to permit the doors to swing outwardly from a closed position to an open position. Upper and lower lock elements having a U-shaped channel are molded into the doors 17, 18. When the doors are in the closed position, the U-shaped channels of the lock element fit over the rear peripheral edges of the upper and lower horizontal support members, preventing movement of the hinges along the hinge line when the supports are in the expanded, operable position, thereby maintaining the frame members 10, 11 in the fully separated, operable position. The doors 17, 18 can be made in a variety of widths to allow for various wheelchair size.

A locking hinged clasp 82 is provided to lock the doors together into the closed position. Facing the rear of the wheelchair, the hinge clasp is mounted on the left door. Two plastic blocks are aligned vertically and mounted along the inner edge of the right door for the hinge clasp to lock around prior to being snapped closed. The blocks are separated by approximately ⅛ of an inch. The inner side of the clasp has a horizontal ridge that fits into a slot, thereby maintaining proper alignment of the doors when the clasp is locked.

The area between the upper and lower support members, the side supports and the rear doors, serves as a storage area. Two plastic brackets 39 affixed to each side frame member are used to attach bungee cords that hold a rectangular nylon net 40 across the front of the storage area. The first of the brackets is located on each of the side frame members immediately above and forward of the intersection of the front edge of the lower support and side frame members. On each side frame member, a second bracket is located approximately 6 inches above the first bracket. The nylon net 40 is sewn to provide sleeves along the upper and lower edges of the net across the entire width thereof. A bungee cord, with plastic clips at each end, is inserted through each of the respective upper and lower sleeves. The ends of the upper bungee cord attach to the two upper brackets on the side supports, stretching the bungee cord between the side frame members and across the storage area. The lower bungee cord has one end attached to each of the lower brackets.

The armrests 34, 35 are removably fitted to the side frame members and detach therefrom to allow ingress and egress of a person in and out of the wheelchair. A vertical tongue located at the upper rear portion of the armrest, as shown in FIG. 1, facilitates attached alignment of the armrests to the respective frame members. Each frame member includes a groove to slidably receive the tongue. Additionally, horizontal tongues are provided on the bottom of the forward portion of the armrests and mating grooves are provided in the frame members for sliding, interlocking engagement of the horizontal tongues therewith. Lastly, each armrest is affixed into place using a removable bolt provided with a plastic bolt grip 42, 43. The bolt grip provides a quick, easy method for removing the bolt to thereby enable removal of the armrest. The right armrest is provided with a cup holder 38 in the upper portion of the armrest, centered on the outer edge.

There are dual grip handles provided at the upper rear zone of each side frame member as shown in several of the drawing figures. The upper grip handles 31, 33 on each structure is used for pushing the wheelchair in a normal fashion. The lower grip handles 30, 32 are angled at approximately 65° counterclockwise from horizontal, when viewing the right side of the wheelchair. The positioning of the lower grip handles provides greater leverage for pulling the wheelchair through rugged terrain, such as sand, tall grass, or snow.

The foot rest is embodied as an adjustable plate 44 located at the lower forward portion of the wheelchair. The plate is attached to the lower portion of an adjustable U-shaped aluminum tubular structure 45 that protrudes downward at an angle approximately 45° from the horizontal, when viewing the right side of the wheelchair. The plate is affixed into place using metal clamps 46 secured around the tube and to the underside of the plate. In order to prevent undesirable movement of the plate, relative to the tube, the underside of the plate is contoured for congruent, fitted receipt of the tube thereagainst.

The upper sides of the U-shaped tube slides into upper support tubes 47. The upper support tubes fit into cylindrical holes 48 in each side frame member. Bolts are provided in each side structure to affix the upper support tubes into place. Each side of the U-tube slides into an upper support tube. A bolt with a plastic bolt grip is provided on each side of the upper support tubes to hold the U-tube in place. The bolts can be loosened to adjust the height of the U-tube and then re-tightened to hold the position of the U-tube firm. A canvass band 49 is attached across the two upper support tubes and functions as a calf rest.

An optional shade cover is available. The shade cover is embodied as a. structure formed by two aluminum tubes and a rectangular piece of canvas. An aluminum tube fits into a cylindrical hole 50 provided in each of the side frame members 10, 11. The tubes protrude upwards, approximately 12 inches at the same angle of the upper rear portion of the side frame member. From there, the tubes bend forward approximately 135° with a large radius, approximately 3 inches, so that the upper portion of the tubes are horizontal. A rectangular piece of canvas ifs strung between the aluminum tubes. The canvass is sewn to provide a cylindrical channel on each side of the canvas through which the upper portion of the aluminum tubes can be inserted to support the canvas in place.

The front wheels 52, 53 and rear wheels 36,37 are constructed to be extra wide for an increased surface contact area in softer terrain. On each rear wheel, the rim surface 60, 61 extends axially away from the outer and inner edges of the tire, creating an enlarged ground engaging area in softer terrain. From the outer edge of the tire, an outboard extension forms an integrated handrail for manual propulsion. The outboard extension is approximately 100% wider than the tire 64, 65 which is the primary ground engaging surface. The width of the rim allows the user to grab the rim with the entire hand area, thereby providing better control and enabling one to apply sufficient force for propulsion of the wheel. An inboard rim extension adjacent the inner edge of the tire is at least 50% of the width of the tire.

The increased surface area provided by the rim 60, 61 limits sinking of the wheels into soft soils and sand. Traction means are provided as transverse ribs extending outwardly and inwardly from the base of the tire to the edges of the rim. The transverse ribs serve as a grip means when turning the wheels and improve traction while traversing across soft surfaces. The tires 64, 65 are all terrain style, having larger tread than conventional tires, to additionally aid in traction and add to the rugged appeal of the wheelchair.

The rear wheel further include struts 68 which extend from the hubs 70, 71 to the rims 60, 61. Each strut is constructed with an enlarged surface area generally transverse to the plane of the wheel, forming paddle like structures for use as a propulsion means in water. The outer edge of each strut is narrower than the inner edge creating an angle surface which deflects water away from the wheelchair as the wheel turns in the water. The outer peripheral zone of each strut is shaped to provide an opening 69 to avoid interference with the hand while manually turning the wheels. Each strut is rectangular in shape except that the outer corner of the upper peripheral zone is formed by two angles of approximately 45°. The angle on the upper peripheral edge is located approximately 2 inches from the outer end of the rim and the angle on the outer edge is located approximately 1.5 inches from the rim, creating a gap to accommodate the user's hand when manually propelling the wheels. The corners and edges of the struts are rounded to provide a smooth contour.

The front wheels 52, 53 are pivotally mounted to the side frame members. On each front wheel, the rim surface 62, 63 is at least 100% wider than the primary ground engaging surface and extends axially outwardly from the both sides of the tire. As with the rear wheels, the rim increases the ground engaging surface area in soft soil and sand.

A groove formed about the outer circumferential surface of each rim is sized and configured to accept the tire 66, 67 and an inflatable inner tube thereon, without the use of tools.

The hubs 70, 71 each utilize 316 surgical stainless steel ball bearings in a housing formed of DELRIN plastic. This creates a maintenance free bearing system. The outside diameter of the hub is approximately 2 inches while the inside diameter is approximately 1 inch. Bushings are used to fit the ½ inch axle into the hub. Various axle sizes may be fitted to the hub by merely changing the bushing.

The wheel bearing housing is designed to allow for an easy release hubcap 72, 73 to make bearing area accessible for tightening, a fresh water rinse, and to check bearing assembly. The housing also provides an outer bearing lock system with notches that eliminates the need for a metal race area and helps decrease bearing housing wear.

A wheel brake 74, 75 is provided for each of the rear wheels. One brake i<, positioned on each side structure using a C-channel embedded in the side frame member just below the armrests and in front of the rear wheel. The C-channels are secured to the side structures with bolts. Two bolts are attached to each brake assembly and extend through threaded holes in square runners fitted in the C-channels. The bolts are tightened to extend to the back wall of the C-channel, applying force that exerts pressure on the square runners to tighten the runners against the outside edge of the C-channel. The static friction between the square runners and the C-channel holds the brake securely in place. Loosening the bolts allows for horizontal adjustment of the brake to compensate for varying tire inflation levels and tread types.

A seat 76 manufactured from nylon or canvas weave material is suspended above the storage compartment of the wheelchair. On each side, the seat material is riveted or grommeted to square aluminum tubes, one attached horizontally to the inside of each side frame member. Plastic end caps are provided to protect the wheelchair occupant from potentially sharp corners at the ends of the tubes.

A panel of nylon or canvas weave material 77 is also fitted between two vertical cylindrical aluminum supports 78, 79, one attached to each side frame member to provide a backrest. At the base, each support is hinged so that backrest may be reclined. Approximately 7 inches from the base, plastic clamps mount around the supports and attach with bolts to two square runners mounted in C-channels. The C-channels are embedded in the side frame members and secured with bolts. The upper end of each C-channel is located approximately 1 inch behind the upper rear joint of the armrest and side frame member. The C channels 80 are approximately 6 inches long and extend at an angle approximately 250 counter clockwise from horizontal. The bolts attaching the clamps have plastic grips so that they may be easily loosened and the inclination angle of the backrest may be adjusted. Approximately 3 inches of adjustment travel is available, following an adjustment from approximately 15° to 40° from vertical.

For storage and transportation purposes, the wheelchair may be collapsed by opening the rear doors, removing the front rigid locking clip 24 from the upper horizontal support 13, and folding both the upper and lower horizontal supports 12, 13 using the hinges 18, 22. A strap 83 on the rear of the wheelchair is used to keep the wheelchair in its folded position. The strap is located midway up the rear surface of the right side support structure as shown in FIG. 9. One end of the strap is permanently attached to the right side frame member with a screw 84. The opposite end of the strap has a hole approximately ½ inch in diameter that mounts over a screw 85 permanently attached to the left side frame member.

An optional flotation device 90 is available for the wheelchair. In the ideal embodiment, the flotation device is made of rotationally molded plastic, hollow in the middle. The flotation device consists of a center section 91 with a bow 92 hingedly attached to the front and outriggers 93, 94 hingedly attached, one on each side of the center section. The outriggers are approximately the same length as the center section and half of the width. The bow 92 is the same width as the center section 91 and approximately half of the length. The bow 92 and forward ends of the outriggers 93, 94 are molded in the same shape as the bow of a boat. At the rear of the center section a tub-like structure 95 is built in with a removable top 96 to form a storage or cooler area. The top of the storage structure rises above the rest of the center section. When being stored or transported, the bow unit 93 folds back on top of the center section with the nose of the bow not reaching the cooler section. The height of the bow and center section combined when the bow is folded back is equal the height of the storage section. The outrigger sections 93, 94 fold inward to rest across the top of the folded bow and the storage section. Handles 97 are provided on top of the outriggers (folded position) to aid in transportation.

In use, the outrigger sections and bow are unfolded to a fully deployed position. To install into the wheelchair, the rear doors 17, 18 of the wheelchair are opened and the net 40 across the storage area is removed. The bow of the flotation device and the center section are inserted through the storage area of the wheelchair from the rear. The bow of the flotation device extends just past the forward end of the storage area. The outriggers lie alongside the wheelchair allowing clearance for the rear wheels 36, 37 to turn and provide propulsion. In the preferred embodiment, channels are provided in the forward sections of the wheelchair side frame members 10, 11 to accommodate insertion of brackets attached to outriggers to give greater stability in the water.

Now that the invention has been described,

What is claimed is:

1. A wheelchair comprising:

a left frame member and a right frame member, said left and right framer members each including an inboard side, an outboard side, a forward nose portion, an armrest portion and a handle portion;

left and right front wheels each rotatably and pivotally mounted to said forward nose portion of a respective one of said left and right frame members;

left and right rear wheels each rotatably mounted to the wheelchair in spaced, adjacent, relation to said outboard side of a respective one of said left and right frame members;

a collapsible seat and a collapsible backrest attached between said left and right frame members;

expanding and collapsing means hingedly attached between said left and right frame members for supporting and maintaining said left and right frame members in spaced, parallel relation to one another, said expanding and collapsing means including an upper brace member and a lower brace member, said operable brace members being in unison between a folded, collapsed position to move said left and right frame members towards one another and an expanded, locked position to maintain said left and right frame members spaced apart at a maximum distance, thereby defining an operable position of said frame members;

said upper and lower brace members each including a pair of panels each being hingedly attached to said inboard side of a respective one of said left and right frame members, said pair of panels being further hingedly attached to one another, along adjacently positioned edges, defining a central folding seam, wherein said pair of panels are movable relative to one another and said left and right frame members between a folded position and an extended position, thereby defining said collapsed and operable positions, respectively, and said pair of panels of each of said upper and lower support members defining a box structure surrounding an interior storage area when said pair of panels are in said extended position; and lock means for releasably holding and maintaining said upper and lower brace members in said expanded, locked positions.

2. The wheelchair as recited in claim 1 wherein said expanding and collapsing means further includes a rear door assembly, including a left door hingedly attached to said inboard of said left frame member and a right door hingedly attached to said inboard side of said right frame member, said left and right doors being movable between an open position against said inboard sides of said respective left and right frame members when said frame members are in said open position and a closed position in covering relation to an open back end of said box structure.

3. The wheelchair as recited in claim 2 wherein said left and right doors include clasping means for interlocking said left and right doors, thereby maintaining said left and right doors in said closed position.

4. The wheelchair as recited in claim 3 wherein said left and right doors include means for engaging said upper brace member to hold said pair of panels of said upper brace member in said extended position.

5. The wheelchair as recited in claim 4 further including means extending between said left and right frame members, below said lower brace member, for preventing said central folding seam between said pair of panels of said lower brace member from moving downwardly from said extended position, thereby supporting said lower brace member in said expanded, locked position.

* * * * *